US011615657B2

(12) United States Patent
Aubert-Moulin

(10) Patent No.: US 11,615,657 B2
(45) Date of Patent: Mar. 28, 2023

(54) AIRCRAFT ENGINE GRAPHICAL DIAGNOSTIC TOOL

(71) Applicant: PRATT & WHITNEY CANADA CORP., Longueuil (CA)

(72) Inventor: Pierre Aubert-Moulin, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 323 days.

(21) Appl. No.: 16/866,404

(22) Filed: May 4, 2020

(65) Prior Publication Data

US 2021/0295618 A1 Sep. 23, 2021

Related U.S. Application Data

(60) Provisional application No. 62/990,669, filed on Mar. 17, 2020.

(51) Int. Cl.
| | |
|---|---|
| G07C 5/08 | (2006.01) |
| G06F 16/9038 | (2019.01) |
| B64D 45/00 | (2006.01) |
| F02C 7/268 | (2006.01) |
| G06F 3/04815 | (2022.01) |
| G06F 3/04847 | (2022.01) |

(Continued)

(52) U.S. Cl.
CPC ........... G07C 5/0816 (2013.01); B64D 45/00 (2013.01); F02C 7/268 (2013.01); G06F 3/0485 (2013.01); G06F 3/04815 (2013.01); G06F 3/04847 (2013.01); G06F 16/9038 (2019.01); G07C 5/008 (2013.01); *B64D 2045/0085* (2013.01)

(58) Field of Classification Search
CPC ... G07C 5/0816; G07C 5/008; G06F 16/9038; G06F 3/04815; G06F 3/04847; G06F 3/0485; B64D 45/00; B64D 2045/0085; F02C 7/268
USPC ....................................................... 701/29.1
See application file for complete search history.

(56) References Cited

U.S. PATENT DOCUMENTS

| | | |
|---|---|---|
| 6,021,269 A | 2/2000 | Lewis |
| 7,605,814 B1 | 10/2009 | Critz |
| 8,060,346 B2 | 11/2011 | Astolfi et al. |

(Continued)

FOREIGN PATENT DOCUMENTS

| | | |
|---|---|---|
| EP | 3540534 | 9/2019 |
| WO | 2009037077 | 3/2009 |

OTHER PUBLICATIONS

Extended European Search Report dated Aug. 6, 2021 in counterpart EP application No. 21163230.2.

(Continued)

*Primary Examiner* — William D Titcomb
(74) *Attorney, Agent, or Firm* — Norton Rose Fulbright Canada LLP

(57) ABSTRACT

The present disclosure provides an aircraft engine graphical diagnostic tool, as well as a method and electronic device for operating the same. The graphical diagnostic tool comprises an input element configured for obtaining a data value for a first data dimension, and a visualization element having at least two dimensions. The visualization element is configured for presenting a dataset for at least second and third data dimensions associated with the first data dimension. The dataset presented by the visualization element is selected based on the data value for the first data dimension.

18 Claims, 4 Drawing Sheets

(51) Int. Cl.
*G06F 3/0485* (2022.01)
*G07C 5/00* (2006.01)

(56) References Cited

U.S. PATENT DOCUMENTS

| | | | |
|---|---|---|---|
| 8,199,166 B2 | 6/2012 | Repin et al. | |
| 10,223,076 B1 | 3/2019 | Owen et al. | |
| 10,508,601 B2* | 12/2019 | Sheridan | F01D 21/00 |
| 11,175,657 B1* | 11/2021 | Bloom | B64D 45/00 |
| 2011/0307093 A1* | 12/2011 | Tsai | G05B 19/4062 |
| | | | 700/177 |
| 2014/0007591 A1* | 1/2014 | Khibnik | F01D 21/003 |
| | | | 702/56 |
| 2015/0345325 A1* | 12/2015 | Khibnik | G01M 15/14 |
| | | | 702/185 |
| 2017/0132939 A1* | 5/2017 | Prenot | G08G 5/0021 |
| 2017/0352205 A1* | 12/2017 | Lacaille | G07C 5/0816 |
| 2018/0025557 A1* | 1/2018 | Steinert | G05B 23/0221 |
| | | | 701/99 |
| 2018/0259978 A1* | 9/2018 | Dweik | G06N 20/00 |
| 2018/0260503 A1* | 9/2018 | Dweik | G06N 20/00 |
| 2019/0101876 A1 | 4/2019 | Ghangam et al. | |
| 2019/0180527 A1* | 6/2019 | Segal | G06N 20/00 |
| 2020/0015785 A1 | 1/2020 | Attia et al. | |
| 2020/0172269 A1* | 6/2020 | DeChellis | F01D 17/02 |
| 2020/0334319 A1* | 10/2020 | Kunz | G06F 9/451 |
| 2020/0356958 A1* | 11/2020 | Traxler | G06Q 10/20 |
| 2021/0009282 A1* | 1/2021 | Long | B64D 31/00 |
| 2021/0018333 A1* | 1/2021 | Ramachandra | F02C 9/28 |
| 2021/0354849 A1* | 11/2021 | Kuzbari | B64D 45/00 |

OTHER PUBLICATIONS

European Patent Office, Communication pursuant to Article 94(3) EPC re: European patent application No. 21163230.2, dated Apr. 1, 2022.

* cited by examiner

AIRCRAFT ENGINE GRAPHICAL DIAGNOSTIC TOOL

CROSS-REFERENCE TO RELATED APPLICATIONS

This patent application claims priority of U.S. Provisional Application Ser. No. 62/990,669, filed on Mar. 17, 2020, the entire contents of which are hereby incorporated by reference.

TECHNICAL FIELD

The application relates generally to graphical tools, and more specifically to graphical tools for diagnostics of aircraft engines.

BACKGROUND OF THE ART

In a gas turbine engine, continuous inlet air is compressed, mixed with fuel in an inflammable proportion, and exposed to an ignition source to ignite the mixture which then continues to burn to produce combustion products. The combustion of the air-fuel mixture can be used to power various mechanical components, which in turn can be used to produce thrust. Under normal operating conditions, gas turbine engines are known to produce noise, and certain levels of noise are expected. However, excessive noise can be undesirable for passenger or operator comfort, and in some cases certain types of noise can be indicative of a maintenance need for the gas turbine engine.

Approaches for visualizing noise levels produced by gas turbine engines exist, and are suitable for their purposes. However, improvements are always desirable.

As such, there is room for improvement.

SUMMARY

In accordance with a broad aspect, there is provided an aircraft engine graphical diagnostic tool. The graphical diagnostic tool comprises an input element configured for obtaining a data value for a first data dimension, and a visualization element having at least two dimensions configured for presenting a dataset for at least second and third data dimensions associated with the first data dimension, the dataset presented by the visualization element selected based on the data value for the first data dimension.

In accordance with another broad aspect, there is provided an electronic device for diagnosis of an aircraft engine. The electronic device comprises a processing unit; a display device communicatively coupled to the processing unit; and a non-transitory computer-readable medium having stored thereon instructions executable by the processing unit for causing the processing unit to display, via the display device, the aircraft engine graphical diagnostic tool of any one of the previous embodiments.

In accordance with further broad aspect, there is provided a method for operating an aircraft engine graphical diagnostic tool. A data input indicative of a data value for a first data dimension is obtained via an input element of the graphical diagnostic tool. A dataset for at least second and third data dimensions is obtained based on the data value, the at least second and third data dimensions being associated with the first data dimension. The dataset for the at least second and third data dimensions are presented via a visualization element of the graphical diagnostic tool having at least two dimensions.

Features of the systems, devices, and methods described herein may be used in various combinations, in accordance with the embodiments described herein. In particular, any of the above features may be used alone, together in any suitable combination, and/or in a variety of arrangements, as appropriate.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
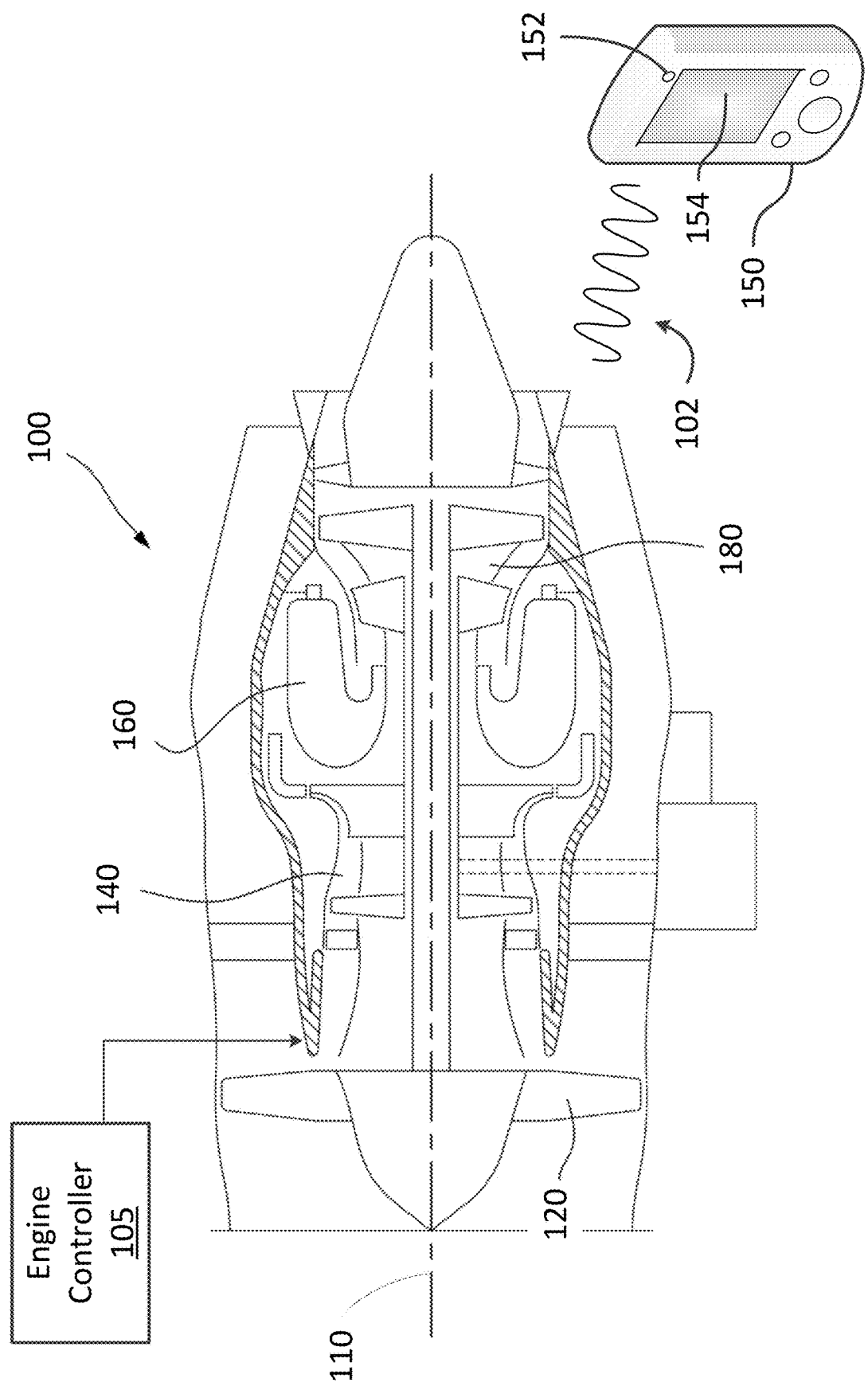
FIG. 1 is a schematic cross-sectional view of an example gas turbine engine.

With reference to FIG. 1, there is illustrated a gas turbine engine 100. Note that while engine 100 is a turbofan engine, the methods and systems described herein may be applicable to turboprop, turboshaft, and other types of gas turbine engines, or combustion engines generally. In addition, the engine 100 may be an auxiliary power unit (APU), an auxiliary power supply (APS), a hybrid engine, or any other suitable type of engine. In addition, although the foregoing discussion relates to a singular engine 100, it should be understood that the techniques described herein can be applied substantially concurrently to multiple engines.

The engine 100 generally comprises in serial flow communication: a fan 120 through which ambient air is propelled, a compressor section 140 for pressurizing the air, a combustor 160 in which the compressed air is mixed with fuel and ignited for generating a stream of hot combustion gases, and a turbine section 180 for extracting energy from the combustion gases. Axis 110 defines an axial direction of the engine 100. In some embodiments, a low pressure spool is composed of a low pressure shaft and a low pressure turbine. The low pressure shaft drives the propeller 120. A high pressure spool is composed of a high pressure turbine attached to a high pressure shaft, which is connected to the compressor section 140. It should be noted that other configurations for the engine 100 are also considered.

Control of the operation of the engine 100 can be effected by one or more control systems, for example an engine controller 105. The engine controller 105 can modulate a fuel flow rate provided to the engine 100, the position and/or orientation of variable geometry mechanisms within the engine 100, a bleed level of the engine 100, and the like. Alternatively, or in addition, the engine 100 can be effected by any other suitable control approach, including hydromechanical control schemes, or the like.

In the course of normal operation, the engine 100 will produce noise 102. The noise 102 can include sounds from the flow of air through the engine 100, sounds from combustion taking place in the combustor 160, sounds produced by rotating of compressors in the compressor section 140 and/or of turbines in the turbine section 180, and sounds produced by any other elements of the engine 100. The noise 102 is composed of multiple noise components at varying frequencies and amplitudes. In addition, the level of noise 102 produced by the engine 100 will vary over time, and depending on the operating state of the engine 100. Noise 102 can be produced by a variety of components within the engine 100, and is directed substantially omnidirectionally from the engine 100; alternatively, or in addition, certain noise components composing the noise 102 can be directed in a particular direction.

Analysis of the noise 102 can be performed both to identify maintenance needs for the engine 100, and to attempt to identify sources of noise levels or noise components which negatively affect the comfort of an operator of the engine 100, or of a passenger within a vehicle or other craft of which the engine 100 is a component. For example, the engine 100 can form part of an aircraft, and the noise 102 can be analyzed to reduce the discomfort caused by the noise 102 to passengers of the aircraft. In some embodiments, the engine 100 can be subjected to a testing protocol which simulates a variety of different operating conditions for the engine 100 in a predetermined sequence. The testing protocol can be of any suitable duration, and can cycle through the different operating conditions for the engine 100 in any suitable sequence. The noise 102 produced by the engine 100 during the testing protocol can be analyzed to determine whether particular operating conditions for the engine 100 are producing noise which is a source of discomfort for operators or passengers, or indicative of a maintenance need for the engine 100.

To this end, an electronic device 150 is used to monitor and analyze, or assist in the analysis of, noise 102. The electronic device 150 can be a smartphone, tablet, laptop computer, or any other suitable type of portable electronic device. Alternatively, the electronic device 150 can be a desktop-type computer or other type of computing device. Alternatively still, the electronic device 150 a dedicated handheld device for monitoring and analyzing noise 102. The electronic device 150 is provided with at least a microphone 152 and a display 154.

The microphone 152 can be any suitable type of microphone or other sound capture device via which the noise 102 can be obtained by the electronic device 150. The microphone 152 can be integrated or embedded in the electronic device 150, or can be a peripheral device coupled to the electronic device 150 in any suitable fashion. The microphone 152 is configured for capturing sounds within any suitable frequency range, and of any suitable amplitude. The display 154 can be any suitable type of display, screen, or other device for rendering graphical elements. The display 154 can be of any suitable shape, size, and resolution, and can employ any suitable technology for rendering graphical elements. The display 154 is a two-dimensional display, which can be used to display two-, three-, or other multi-dimensional graphical elements. In some embodiments, the electronic device 150 can include a plurality of displays 154, which can be disposed on the electronic device 150 in any suitable fashion.

The electronic device 150 is provided with suitable computing and communication functionality for interfacing with the microphone 152 to obtain therefrom noise data relating to the noise 102. The noise data relates to a plurality of data dimensions: for instance, the data can relate the amplitude of the noise 102 across a plurality of frequencies over time. In this example, the noise data relates to three data dimensions: amplitude, which can be expressed in decibel (dB); frequency, which can be expressed in Hertz (Hz), and time, which can be expressed in seconds. Other units of measure are also considered. In some embodiments, the electronic device 150 is configured for performing calculations or other transformations to the noise data. For example, the frequency data dimension can be obtained by performing a Fourier transform, a fast-Fourier transform, or other similar transformation, on the noise data. Other approaches are also considered.

The electronic device 150 is also provided with suitable computing and communication functionality for interfacing with the display 154. The electronic device 150 issues instructions to the display 154 for displaying information, for instance relating to the noise data obtained by the microphone 152. For example, the electronic device 150 can instruct the display 154 to generate and display a graphical diagnostic tool which performs, or aids an operator in performing, diagnosis of aircraft engines, for instance analysis of the noise data.

It should be noted that although the foregoing discussion focuses on noise data which is recorded by the microphone 152 during, for example, a testing protocol, in some embodiments the electronic device 150 can acquire noise data from a database and/or other data repository, for instance using network functionality present in the electronic device 150. In some such embodiments, the electronic device 150 may not be provided with the microphone 152 and/or other elements, as appropriate.

Figure 2:
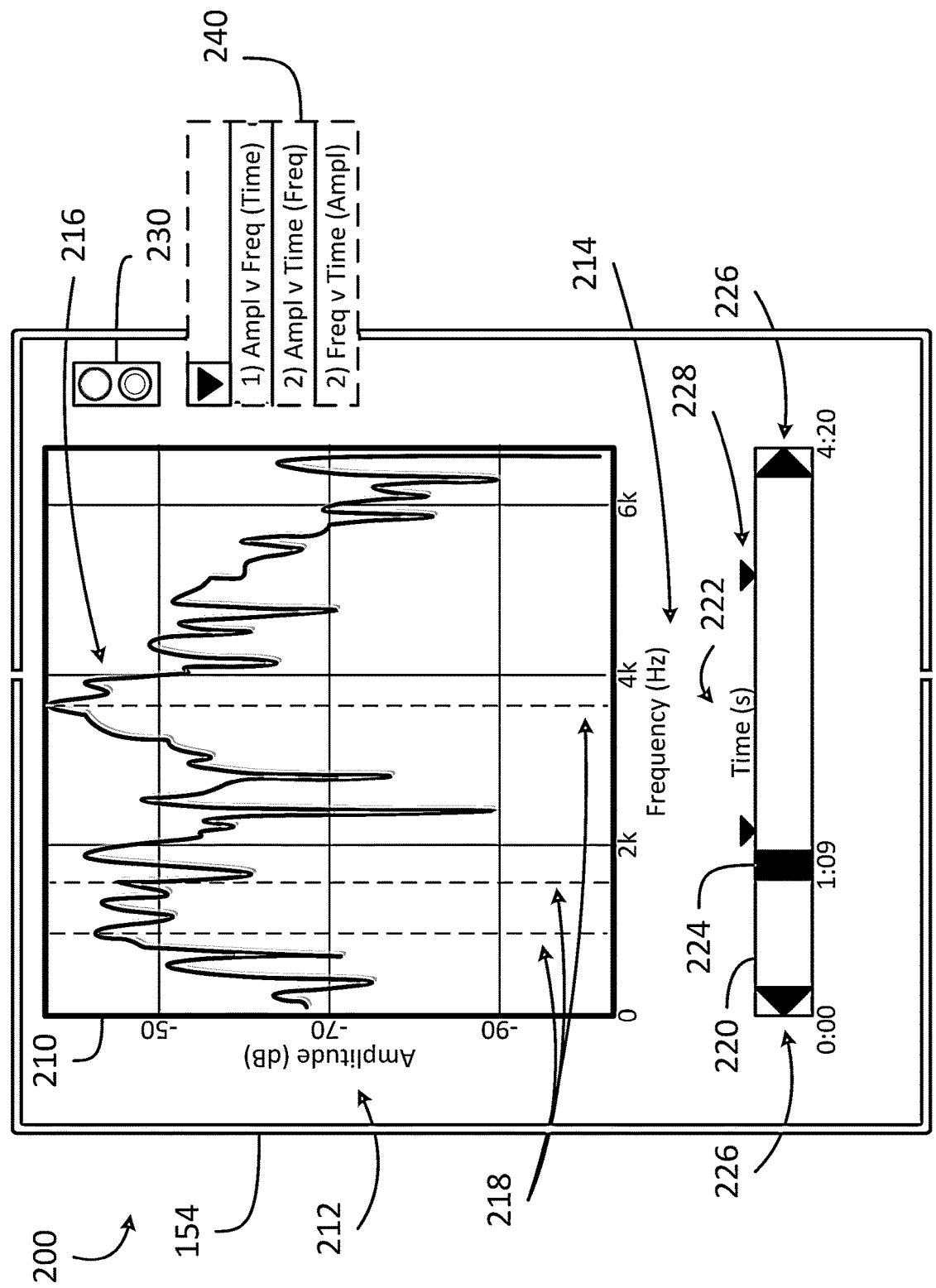
FIG. 2 is an illustration of an example graphical diagnostic tool for aircraft engines.

With reference to FIG. 2, one embodiment of the graphical diagnostic tool, illustrated at 200, is used to display three-dimensional data on the display 154. Although the foregoing discussion focuses primarily on the display of three-dimensional data, it should be noted that embodiments displaying additional dimensions of data are also considered. The graphical diagnostic tool 200 is composed of a visualization element 210 displaying at least two dimensions (2D) of data, and a one-dimensional (1D) input element 220, and is used to display noise data relating to the noise 102 obtained by the microphone 152 of the electronic device 150 and/or otherwise obtained by the electronic device 150, for instance from a database or the like. In the embodiment illustrated in FIG. 2, the visualization element 210 is positioned in an upper part of the display 154, and the input element 220 is positioned in a lower part of the display 154, below the visualization element 210. It should be noted, however, that other arrangements of the visualization element 210 and the input element 220 on the display 154 are considered.

The visualization element 210 is a two-dimensional graphical element which is serves to display two or more data dimensions of the noise data. For example, the visualization element 210 is a two-dimensional graph, plot, or other graphical element. In another example, the visualization element 210 is a three-dimensional graph, curve, or the like; an additional dimension of data, for instance engine temperature data, can also be displayed via the visualization element 210. In the embodiment illustrated in FIG. 2, the visualization element 210 is used to plot the amplitude of the noise data, on axis 212, against the frequency of the noise data, on axis 214. The frequency and amplitude noise data form a dataset, and are displayed as curve 216 within the visualization element 210. The axis 212, 214 can be provided with any suitable scale, as appropriate, which may be adjusted by the electronic device 150 depending on the dataset for the frequency and amplitude noise data. Although shown in FIG. 2 as a line or curve plot, it should be understood that the visualization element 210 can employ other types of plots, including straight line plots, scatter plots, three-dimensional curves, or any other suitable type of plot.

The input element 220 is a one-dimensional graphical element which serves to display one data dimension of the noise data. For example, the input element 220 is a scroll bar. Other types of adjustable or scrollable elements are also considered. In some embodiments, the input element 220 can include a text field in which a value can be input. In the embodiment illustrated in FIG. 2, the input element 220 is used to illustrate the time dimension for the noise data, shown as axis 222. The input element 220 includes a location marker 224 which displays the current location in time for the noise data. The location marker 224 is interactive, allowing a user of the graphical diagnostic tool 200 to adjust a time value for the time dimension by moving the location marker 224 to a different location along the time axis 222. In some embodiments, the input element 220 also includes interactive increment elements 226, which can be located at opposite ends of the axis 222 of the input element 220, or can be collocated at one of the ends of the input element 220. The increment elements 226 offer an alternative method for interacting with the graphical diagnostic tool 200 to move the location of the location marker 224, thereby adjusting the time value for the time dimension.

In some still further embodiments, additional or alternative elements can be provided, for instance a "play" button, which can initiate a playback of the data by incrementing the data value for the time axis 222 successively over time at any suitable rate. In some cases, the electronic device 150 can be provided with a speaker or other sound-producing device, and can replay the noise data as sound concurrently with playback of the data through the visualization element 210 and the input element 220. Other approaches, including "fast-forward", "rewind", skip ahead, skip back, or other functionality, can also be provided, as appropriate.

It should also be noted that although the foregoing discussion focuses primarily on the use of the electronic device 150 as having a touchscreen or other touch-based interaction functionality, the approaches described herein can also be implemented using other types of electronic devices, which can obtain input via one or more keyboards, mice, buttons, switches, dials, or any other suitable type of input. The inputs can be integrated or embedded in the electronic device 150, or can be peripheral thereto. For example, the input element 222 can be associated with a dial or other physical input device, and the value for the input element 222 can be changed by rotating the dial, or by interacting with the physical input device in a suitable fashion. Other approaches are also considered.

As described hereinabove, the graphical diagnostic tool 200 serves to present the noise data obtained via the microphone 152. In some embodiments, the graphical diagnostic tool 200 is launched by interacting with an application present on the electronic device 150. The application obtains the noise data, and prepares it for presentation via the graphical diagnostic tool 200. For example, the location marker 224 begins at a leftmost position on the axis 222 of the input element 220—in this case, where the time value is 0:00 (zero)—and the visualization element 210 displays a curve 216 for a dataset of the amplitude-versus-frequency data associated with the time value at the leftmost position. In other words, the curve 216 displayed when the position marker 224 is at time value 0:00 is a dataset for the amplitude-versus-frequency data acquired by the electronic device 150 at time 0:00, i.e., at the start of the acquisition of noise data. It should be noted that in some embodiments, the first presented position for the time dimension can be any other suitable position.

A user of the graphical diagnostic tool 200 can interact with the graphical diagnostic tool 200 to display the noise data obtained by the electronic device 150 at other times. The user can change the location of the location marker 224, whether by interacting with the location marker 224 directly, or by interacting with the increment elements 226. When the location of the location marker 224 is changed, the graphical diagnostic tool 200 associated a different time value with the input element 220, for instance the time shown in FIG. 2, which is 1:09 (one minute and nine seconds). When a new time value is selected by the user, the graphical diagnostic tool 200 updates the visualization element 210 to display the dataset for the amplitude-versus-frequency data associated with the relevant time value (in this case, at time 1:09).

In this fashion, the user can cycle through the noise data acquired by the electronic device 150, by adjusting the location of the location marker 224. Because the noise data captured by the electronic device 150 involves three data dimensions (time, frequency, and amplitude), visualization of the noise data on the display 154 may be difficult, due to the size of the display, and the method of interacting with it. By displaying two data dimensions via the visualization element 210, and the third data dimension via the input element 220, the three data dimensions can nevertheless be visualized, without the need for displaying a three-dimensional plot or waveform on the display 154. In addition, the input element 220 can be used to select particular data values for the associated data dimension, which can allow the user to examine particular datasets for the data dimensions displayed in the visualization element 210.

With continued reference to FIG. 2, in some embodiments the graphical diagnostic tool 200 also includes a toggle element 230. The toggle element 230 can be used to obtain inputs requesting changes in the configuration of the graphical diagnostic tool 200, for instance from the user of the graphical diagnostic tool 200. In the embodiment illustrated in FIG. 2, the toggle element 230 provides two options, with the upper option being selected, and the lower option being selectable. In some embodiments, the toggle element 230 is used to change between different configurations of the data dimensions which are displayed in the visualization element 210. For example, selecting the lower option of the toggle element 230 can serve to swap the position of the amplitude axis 212 with the frequency axis 214. In some other embodiments, the toggle element 230 is used to change between different configurations of the data dimensions for the graphical diagnostic tool 200 as a whole. For example, selecting the lower option of the toggle element 230 can serve to move the frequency data dimension to the input element 220, and the time data dimension is presented via the visualization element 210, for instance taking the place of the frequency axis 214. Other approaches are also considered.

In some further embodiments, the graphical diagnostic tool 200 also includes a selection element 240. The selection element 240 can take the form of a dropdown menu or other graphical element for making a selection, including a selection wheel or the like. The selection element 240 can be used to obtain inputs requesting changes in the configuration of the graphical diagnostic tool 200, for instance from the user of the graphical diagnostic tool 200. In the embodiment illustrated in FIG. 2, the selection element 240 provides three options for the assignment of the data dimensions (time, frequency, and amplitude) to the visualization element 210 and the input element 220. In the embodiment illustrated in FIG. 2, the first option (named "1) Ampl v Freq (Time)") is greyed, because the first option is currently presented via the graphical diagnostic tool 200. Selection of the second or third options can be performed to alter the configuration of the graphical diagnostic tool 200. For example, selecting the second option (named "2) Ampl v Time (Freq)") would alter the visualization element 210 to display the amplitude data dimension against the time data dimension, and associate the frequency data dimension to the input element 220. It should be noted that the dropdown menu illustrated as part of the selection element 240 is shown here as extending beyond the display 154 solely for ease of understanding and illustration. In practice, the dropdown menu may overlap with the visualization element 210. Alternatively, or in addition, interacting with the selection element 240 may cause the visualization element 210 to be resized. Other approaches are also considered.

The selection element 240 can also be used for other purposes. For example, the selection element 240 can list the data dimensions present in the noise data (time, frequency, and amplitude) and selection of any one of the data dimensions causes the graphical diagnostic tool 200 to associate the selected data dimension to the input element 220. The toggle element 230 can then be used to vary the configuration of the remaining data dimensions within the visualization element 210. In another example, the graphical diagnostic tool 200 can include multiple selection elements 240, which can be used to select from different sets and subsets of configurations of the data dimensions.

In some embodiments the visualization element 210 additionally includes one or more markers 218. The markers 218 are associated with one of the data dimensions of the noise data, in this case the frequency axis 214, and serve to identify reference values for the associated data dimension. For example, in the case of the engine 100, the markers 218 can be marked at the frequencies of rotation of certain predetermined elements of the engine 100. For instance, a first marker 218 is associated with a speed of rotation of a first spool of the engine 100; a second marker 218 is associated with a speed of rotation of a second spool of the engine 100; and a third marker 218 is associated with speed of rotation of a fan of the engine 100. In some embodiments, the input element 220 also includes reference markers 228, which can be located on or proximate to the input element 220. The reference markers 228 are interactive, and when interacted with, cause the position marker 224 to be moved to a reference location, for instance substantially aligned with the reference markers 228. The input element 220 can include any number of reference markers 228, which can be associated with points of interest within the data dimension associated with the input element 220. For example, when the input element 220 is associated with the time dimension, the reference markers 228 can be associated with different times of interest. The times of interest can be defined based on the testing protocol performed for the engine 100, for instance times at which different operating conditions for the engine 100 are achieved within the testing protocol.

Although the foregoing discussion focuses on scenarios in which the graphical diagnostic tool 200 is used to present three-dimensional data relating to noise 102 produced by the engine 100, it should be understood that the graphical diagnostic tool 200 can be used in other contexts, to display other types of data. Use cases for other types of three-dimensional data are also considered. For instance, the graphical diagnostic tool 200 could be used to display vibration data, or other types of data relating to the operational parameters of the engine 100. In some other instances, other relationships which vary over time, for instance during a testing protocol, or during normal operation, can also be displayed via the graphical diagnostic tool 200.

Figure 3:
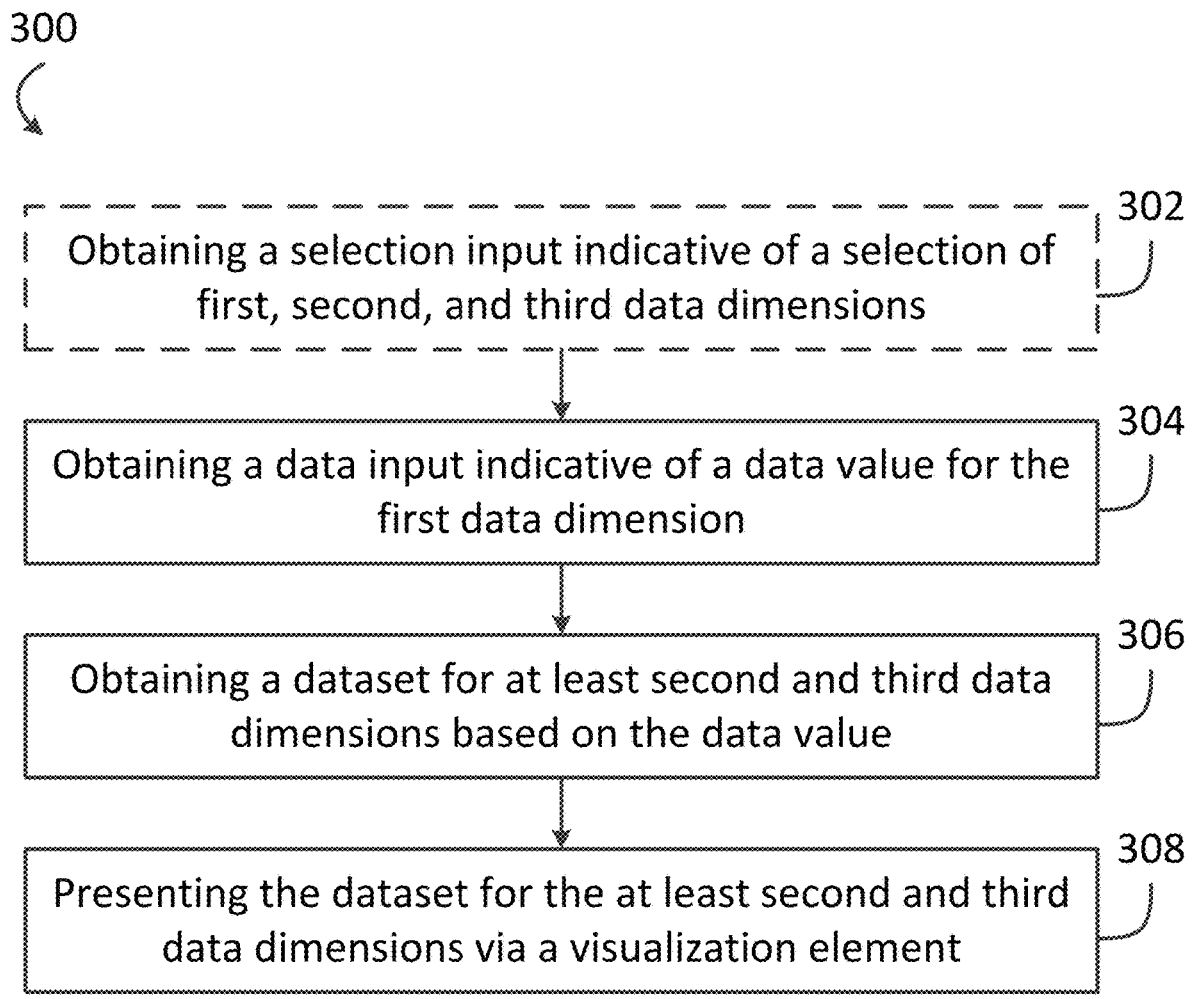
FIG. 3 is a flowchart of an example method for operating a graphical diagnostic tool for aircraft engines.

With reference to FIG. 3, there is illustrated a method 300 for operating a graphical diagnostic tool, for instance the graphical diagnostic tool 200. In some embodiments, the method 300 can be implemented by the electronic device 150. Optionally, at step 302, a selection input is obtained, which is indicative of a selection of first, second, and third data dimensions. For example, the selection input can include a selection of time, frequency, and amplitude as the three data dimensions. In some examples, the selection input can also include an indication of which of the first, second, and third data dimensions are to be displayed as part of a two-dimensional visualization element, for instance the visualization element 210, and which of the first, second, and third data dimensions are to be displayed via a one-dimensional input element, for instance the input element 220. In some embodiments, the selection of the data dimensions and, optionally, their association with the visualization element 220 and the input element 210 are predetermined, and step 302 can be omitted.

At step 304, a data input indicative of a data value for the first data dimension is obtained. The data value can be associated with a position along the input element, for instance the time dimension of axis 222, or with any other suitable representation.

At step 306, a dataset for second and third data dimensions, for instance the frequency and amplitude dimensions of axes 214 and 212, is selected based on the data value for the time dimension. In some embodiments, the data for presentation via the graphical diagnostic tool 200, for instance the noise data obtained by the microphone 152 of the electronic device 150, is stored in an array or other data structure which aligns the data for each of the first, second, and third data dimensions (in the example of FIG. 2: time, frequency, and amplitude). As a result, once the data value for the time dimension is obtained at step 304, the dataset for the second and third data dimensions can be selected by querying the array or data structure used to store the noise data.

At step 308, the dataset for the amplitude and frequency dimensions is presented via a two-dimensional visualization element, for instance the visualization element 210. The dataset can be presented in any suitable fashion, including via a two-dimensional graph, plot, or curve, for example the curve 216. In some embodiments, the visualization element 210 can also present one or more markers, for instance the markers 218, which are indicative of reference values for the amplitude or the frequency dimensions.

Subsequent input can be obtained to further adjust the position of the input element 220, by repeating step 304, which in turn can result in a different dataset being selected and presented via the visualization element 210, by repeating steps 306 and 308. The subsequent input adjusting the position of the input element 220 can be provided in a variety of fashions, including by moving the position marker 224, and/or by interacting with the increment elements 226 or the reference markers 228. Input from additional elements within the graphical diagnostic tool 200, including the toggle element 230 and the selection element 240, to effect other changes to the graphical diagnostic tool 200, as described hereinabove.

Figure 4:
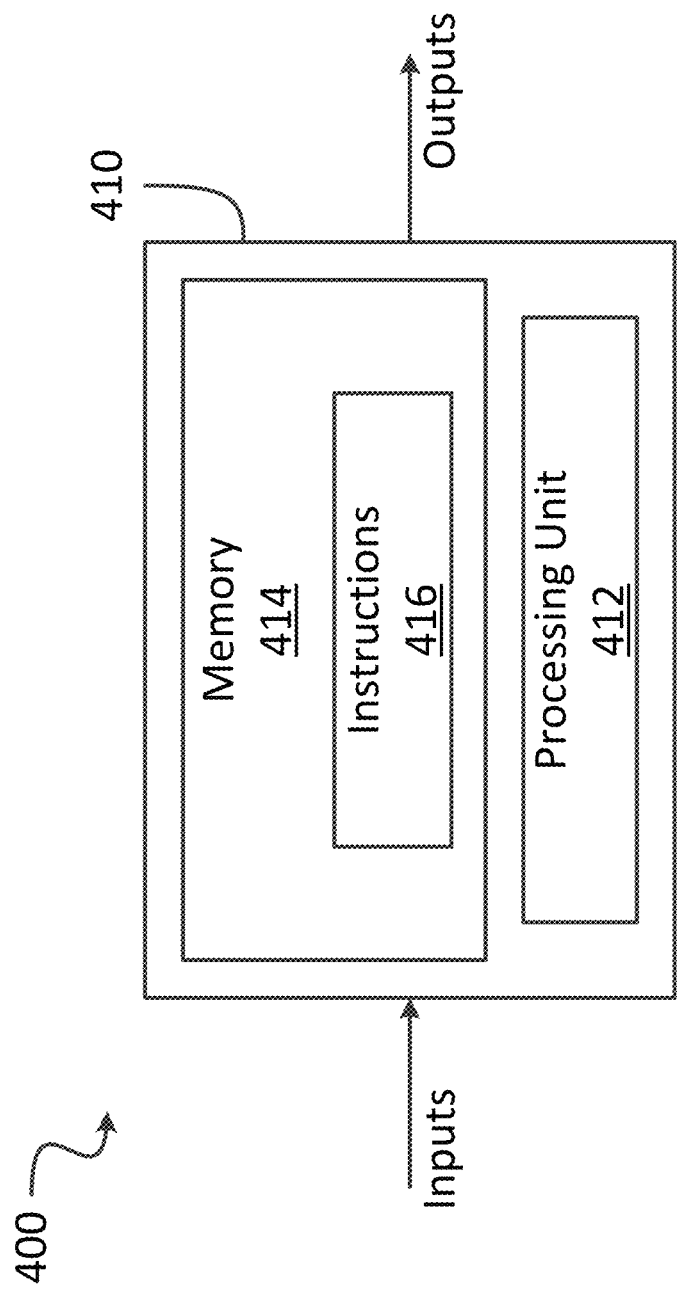
FIG. 4 is block diagram of an example computing device for implementing the method of FIG. 3.

With reference to FIG. 4, the method of FIG. 3 may be implemented by a computing device 410, as an embodiment of the electronic device 150. The computing device 410 comprises a processing unit 412 and a memory 414 which has stored therein computer-executable instructions 416.

The processing unit 412 may comprise any suitable devices configured to implement the functionality of the electronic device 150 such that instructions 416, when executed by the computing device 410 or other programmable apparatus, may cause the functions/acts/steps performed by the electronic device 150 as part of the method 300 and as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. It should be noted that the memory 414 can also be used to store other data, for instance the noise data, which can be recorded by the microphone 152 or obtained from a database or the like.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine graphical diagnostic tool for displaying three-dimensional data relating to an operational parameter of an aircraft engine, comprising:
    a display screen configured to render:
        an input element configured for obtaining a data value in a first data dimension of the three-dimensional data; and
        a visualization element configured for graphically presenting a two-dimensional dataset from the three-dimensional data, the two-dimensional dataset having a second data dimension and a third data dimension of the three-dimensional data, the two-dimensional dataset associated with the data value in the first data dimension in the three-dimensional data.

2. The graphical diagnostic tool of claim 1, wherein the display screen is configured to render a selection element configured to receive a selection input indicative of a section of the first data dimension from the first, second and third data dimensions.

3. The graphical diagnostic tool of claim 1, wherein the display screen is configured to render a toggle element providing configuration options for the second and third dimensions and configured to receive a selection to alternate between first and second configurations of the first, second and third data dimensions.

4. The graphical diagnostic tool of claim 1, wherein the display screen is configured to render at least one interactive increment element collocated with the input element for incrementing the data value for the first data dimension by a predetermined increment.

5. The graphical diagnostic tool of claim 1, wherein the display screen is configured to render at least one reference marker configured to be interacted with to set the data value of the input element to a reference value.

6. The graphical diagnostic tool of claim 1, comprising at least one marker defined within the visualization element, the at least one marker indicative of a reference value for one of the second and third data dimensions.

7. The graphical diagnostic tool of claim 1, wherein the input element comprises a scrollable element defining a position along an axis, the position defining the data value.

8. The graphical diagnostic tool of claim 7, wherein the scrollable element comprises a scroll bar.

9. The graphical diagnostic tool of claim 1, wherein the first data dimension is a time dimension, wherein the second data dimension is a frequency dimension, and wherein the third data dimension is an amplitude dimension.

10. An electronic device for diagnosis of an aircraft engine, comprising:
    a processing unit;
    a display device for displaying three-dimensional data relating to an operational parameter of the aircraft engine, the display device communicatively coupled to the processing unit; and
    a non-transitory computer-readable medium having stored thereon instructions executable by the processing unit for causing the processing unit to display, via the display device:
        an input element configured for obtaining a data value in a first data dimension of the three-dimensional data; and
        a visualization element configured for graphically presenting a two-dimensional dataset from the three-dimensional data, the two-dimensional dataset having a second data dimension and a third data dimension of the three-dimensional data, the two-dimensional dataset associated with the data value in the first data dimension in the three-dimensional data.

11. A method for operating an aircraft engine graphical diagnostic tool, comprising:
    receiving three-dimensional data relating to an operational parameter of an aircraft engine;
    obtaining, via an input element rendered on a display screen of the graphical diagnostic tool, a data input indicative of a data value in a first data dimension of the three-dimensional data;
    obtaining a two-dimensional dataset from the three-dimensional data, the two-dimensional dataset having a second data dimension and a third data dimension of the three-dimensional data, the two-dimensional dataset being associated with the data value for the first data dimension; and presenting the two-dimensional dataset for the second and third data dimensions via a visualization element rendered on the display screen of the graphical diagnostic tool.

12. The method of claim 11, comprising obtaining, via a selection element of the graphical diagnostic tool, a selection input indicative of a selection of the first data dimension from the first, second and third data dimensions.

13. The method of claim 11, comprising obtaining, via a toggle element of the graphical diagnostic tool, a toggle input indicative of a request to alternate between first and second configurations of the first, second and third data dimensions.

14. The method of claim 11, comprising obtaining, via an increment element of the graphical diagnostic tool collocated with the input element, an increment input for incrementing the data value for the first data dimension via a predetermined increment.

15. The method of claim 11, comprising obtaining, via a reference marker of the graphical diagnostic tool, a reference value input for setting the data value of the input element to a reference value.

16. The method of claim 11, comprising presenting, as part of the visualization element, at least one marker indicative of a reference value for one of the second and third data dimensions.

17. The method of claim 11, wherein obtaining, via the input element, the data input comprises obtaining a position along an axis from a scrollable element forming part of the input element, the position defining the data value.

18. The method of claim 17, wherein the scrollable element comprises a scroll bar.

* * * * *